(12) United States Patent
Miller et al.

(10) Patent No.: US 7,644,442 B2
(45) Date of Patent: Jan. 5, 2010

(54) SYSTEMS AND METHODS FOR USING MACHINE ATTRIBUTES TO DETER SOFTWARE PIRACY IN AN ENTERPRISE ENVIRONMENT

(75) Inventors: Ronald W. Miller, Sammamish, WA (US); Xiaoxi Tan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 11/089,071

(22) Filed: Mar. 24, 2005

(65) Prior Publication Data

US 2005/0182732 A1    Aug. 18, 2005

Related U.S. Application Data

(63) Continuation-in-part of application No. 10/356,225, filed on Jan. 31, 2003, now Pat. No. 7,356,709.

(51) Int. Cl.
G06F 7/04      (2006.01)
G06F 21/00     (2006.01)
(52) U.S. Cl. .............................. 726/26; 705/56; 705/59
(58) Field of Classification Search ................. 713/193; 705/59, 56; 709/229; 726/31, 26
See application file for complete search history.

(56) References Cited

U.S. PATENT DOCUMENTS

| | | | | |
|---|---|---|---|---|
| 4,688,169 | A |   | 8/1987 | Joshi .......................... 364/200 |
| 5,138,712 | A | * | 8/1992 | Corbin ........................ 726/30 |
| 5,182,770 | A |   | 1/1993 | Medveczky et al. ............ 380/4 |
| 5,204,897 | A |   | 4/1993 | Wyman et al. ................. 380/4 |
| 5,260,999 | A |   | 11/1993 | Wyman |
| 5,319,705 | A |   | 6/1994 | Halter et al. ................... 75/54 |
| 5,553,139 | A |   | 9/1996 | Ross et al. ..................... 705/59 |
| 5,742,757 | A | * | 4/1998 | Hamadani et al. ............. 726/32 |
| 5,745,879 | A | * | 4/1998 | Wyman ......................... 705/1 |
| 5,754,763 | A |   | 5/1998 | Bereiter |
| 5,845,065 | A | * | 12/1998 | Conte et al. ................... 726/31 |
| 5,903,650 | A | * | 5/1999 | Ross et al. ..................... 705/59 |
| 5,905,860 | A |   | 5/1999 | Olsen et al. |
| 5,935,243 | A | * | 8/1999 | Hasebe et al. ................. 726/26 |
| 6,006,035 | A |   | 12/1999 | Nabahi et al. ............... 395/712 |
| 6,023,766 | A | * | 2/2000 | Yamamura .................... 726/29 |

(Continued)

FOREIGN PATENT DOCUMENTS

WO    WO00/75760 A1    12/2000

OTHER PUBLICATIONS

Musich, P. "MSPs Make Big Deals- As Customers' Needs Change, Small Companies License Software, Team with Larger Vendors", *EWEEK*, 2002, 19(26) (Jul. 1) 23.

(Continued)

*Primary Examiner*—Techane J Gergiso
(74) *Attorney, Agent, or Firm*—Woodcock Washburn LLP

(57) ABSTRACT

A method, system and computer-readable medium for deterring software piracy in a volume license environment. A volume license key embedded within a volume license file is received. The volume license key has first data derived from at least one machine attribute of the environment. The volume license file is authenticated using second data derived from at least one machine attribute of the environment. A software package associated with the volume license key is then activated on at least one computing device in the environment.

11 Claims, 5 Drawing Sheets

U.S. PATENT DOCUMENTS

| | | | | |
|---|---|---|---|---|
| 6,059,838 | A | 5/2000 | Fraley et al. | 717/108 |
| 6,067,622 | A | 5/2000 | Moore | 713/200 |
| 6,108,420 | A | 8/2000 | Larose et al. | 705/59 |
| 6,134,324 | A | 10/2000 | Bohannon et al. | 705/52 |
| 6,134,659 | A | 10/2000 | Sprong et al. | 713/190 |
| 6,169,976 | B1* | 1/2001 | Colosso | 705/59 |
| 6,188,995 | B1* | 2/2001 | Garst et al. | 705/59 |
| 6,223,288 | B1 | 4/2001 | Byrne | 713/190 |
| 6,226,747 | B1 | 5/2001 | Larsson et al. | |
| 6,263,492 | B1 | 7/2001 | Fraley et al. | 717/107 |
| 6,343,280 | B2* | 1/2002 | Clark | 705/55 |
| 6,385,726 | B1* | 5/2002 | Hasebe et al. | 713/182 |
| 6,460,140 | B1* | 10/2002 | Schoch et al. | 726/22 |
| 6,615,359 | B2* | 9/2003 | Eyres et al. | 726/33 |
| 6,799,277 | B2 | 9/2004 | Colvin | 726/22 |
| 6,810,389 | B1* | 10/2004 | Meyer | 705/59 |
| 6,842,896 | B1 | 1/2005 | Redding et al. | 717/172 |
| 6,859,793 | B1 | 2/2005 | Lambiase | |
| 6,920,567 | B1* | 7/2005 | Doherty et al. | 726/22 |
| 6,948,168 | B1* | 9/2005 | Kuprionas | 717/178 |
| 7,024,696 | B1 | 4/2006 | Bahar | 726/26 |
| 7,035,918 | B1* | 4/2006 | Redding et al. | 709/223 |
| 7,111,285 | B2* | 9/2006 | Smith et al. | 717/140 |
| 7,228,567 | B2* | 6/2007 | Serkowski et al. | 726/30 |
| 2001/0034712 | A1 | 10/2001 | Colvin | 705/52 |
| 2002/0016846 | A1 | 2/2002 | Ono | 709/229 |
| 2002/0161718 | A1 | 10/2002 | Coley et al. | |
| 2003/0050895 | A1 | 3/2003 | Dedrick et al. | 705/59 |
| 2003/0088516 | A1* | 5/2003 | Remer et al. | 705/59 |
| 2003/0149670 | A1* | 8/2003 | Cronce | 705/59 |
| 2003/0156719 | A1 | 8/2003 | Cronce | 380/256 |

OTHER PUBLICATIONS

Schulz, N. "E-Journal Databases: A Long-Term Solution?", *Library Collections Acquisitions & Technical Services*, 2001, 25(4), 449-459.

Kang, W.J. et al., "Dynamic License Control System for an On-line Circulation of Digital Product in Electronic Commerce", *Proceedings of the IASTED International Conference. Internet and Multimedia Systems and Applications*, 2000, 140-144.

In the United States Patent and Trademark Office, Non Final Rejection dated Apr. 18, 2006, 15 pages, in U.S. Appl. No. 10/356,225, filed Jan. 31, 2003.

In the United States Patent and Trademark Office, Final Rejection dated Oct. 16, 2006, 15 pages, in U.S. Appl. No. 10/356,225, filed Jan. 31, 2003.

In the United States Patent and Trademark Office, Advisory Action dated Dec. 8, 2006, 3 pages, in U.S. Appl. No. 10/356,225, filed Jan. 31, 2003.

In the United States Patent and Trademark Office, Non Final Rejection dated Jun. 7, 2007, 13 pages, in U.S. Appl. No. 10/356,225, filed Jan. 31, 2003.

In the United States Patent and Trademark Office, Notice of Allowance dated Nov. 29, 2007, 7 pages, in U.S. Appl. No. 10/356,225, filed Jan. 31, 2003.

* cited by examiner

US 7,644,442 B2

SYSTEMS AND METHODS FOR USING MACHINE ATTRIBUTES TO DETER SOFTWARE PIRACY IN AN ENTERPRISE ENVIRONMENT

CROSS REFERENCE TO RELATED APPLICATION

This application is a continuation-in-part of U.S. patent application Ser. No. 10/356,225, filed Jan. 31, 2003, U.S. Pat. No.: 7,356,709 titled "Systems And Methods For Deterring Software Piracy in a Volume License Environment," the disclosure of which is hereby incorporated by reference as if set forth fully herein.

FIELD OF THE INVENTION

This invention relates to the field of software piracy deterrence and in particular to the field of volume licensing of software using a volume license key (VLK).

BACKGROUND OF THE INVENTION

Software piracy is a worldwide problem that costs software vendors large sums of money every year. One form of piracy, known as casual copying, is sharing and installing software on multiple computers, in violation of the end user license agreement. Product activation is one way to reduce this type of piracy.

Product activation commonly relies on the submission of an installation identification code and/or a hardware identifier to the software vendor. The software vendor in response returns an activation confirmation code. In a typical retail application of product activation, a unique product key is provided with each package of boxed software. Typically, after some grace period, (a period of time after installation of software during which the software will run without being activated), a customer must contact the software vendor to activate his copy of the software. Failure to do so frequently results in deactivation of the software or in degraded functionality of the software. Typically, the unique product key is used to generate a unique product identification code, which may be combined with a hashed hardware-related value to generate an installation identification code that is specific to the machine the software runs on. An activation confirmation that enables the software to run is typically returned to the customer. In this regard, an activation confirmation can also be a license file, or a binary that represents a license. At each login the licensed software checks to see that it is running on essentially the same hardware it was activated on. If the check fails, reactivation is required before the software will run again.

Corporate customers commonly purchase a volume license, because it is not feasible for corporate customers— who may have hundreds or thousands of machines in their domain—to contact the software vendor for each software copy installed to receive a machine-specific activation code. Typically, therefore, holders of volume licenses do not have to contact the software vendor to activate their software, because the software bypasses the activation requirement when a volume license key is detected. Hence, the same volume license key can be used on many different computers, none of which require activation in order for the software to run, before or after the grace period has expired. Although this feature makes volume license keys more convenient for a corporate customer to install software, it is also an attractive target for piracy.

Accordingly, there is a need for a mechanism for making pirating of volume license keys more difficult. The present invention satisfies this need.

SUMMARY OF THE INVENTION

In view of the foregoing shortcomings and drawbacks, a method, system and computer-readable medium for deterring software piracy in a volume license environment is provided herein. In the method, a volume license key embedded within a volume license file is received. The volume license key has first data derived from at least one machine attribute of the environment. The volume license file is authenticated using second data derived from at least one machine attribute of the environment. A software package associated with the volume license key is then activated on at least one computing device in the environment.

In the system, a software package associated with a volume license key that is embedded within a volume license file is provided. The volume license file has first data derived from a machine attribute of the computing environment. An authentication routine is provided for deriving second data from a machine attribute of the computing environment and comparing the second data to the first data. Furthermore, an activation routine for activating the software package according to the volume license key and in response to authenticating the volume license file is also provided.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Example Computing Environment

Figure 1:
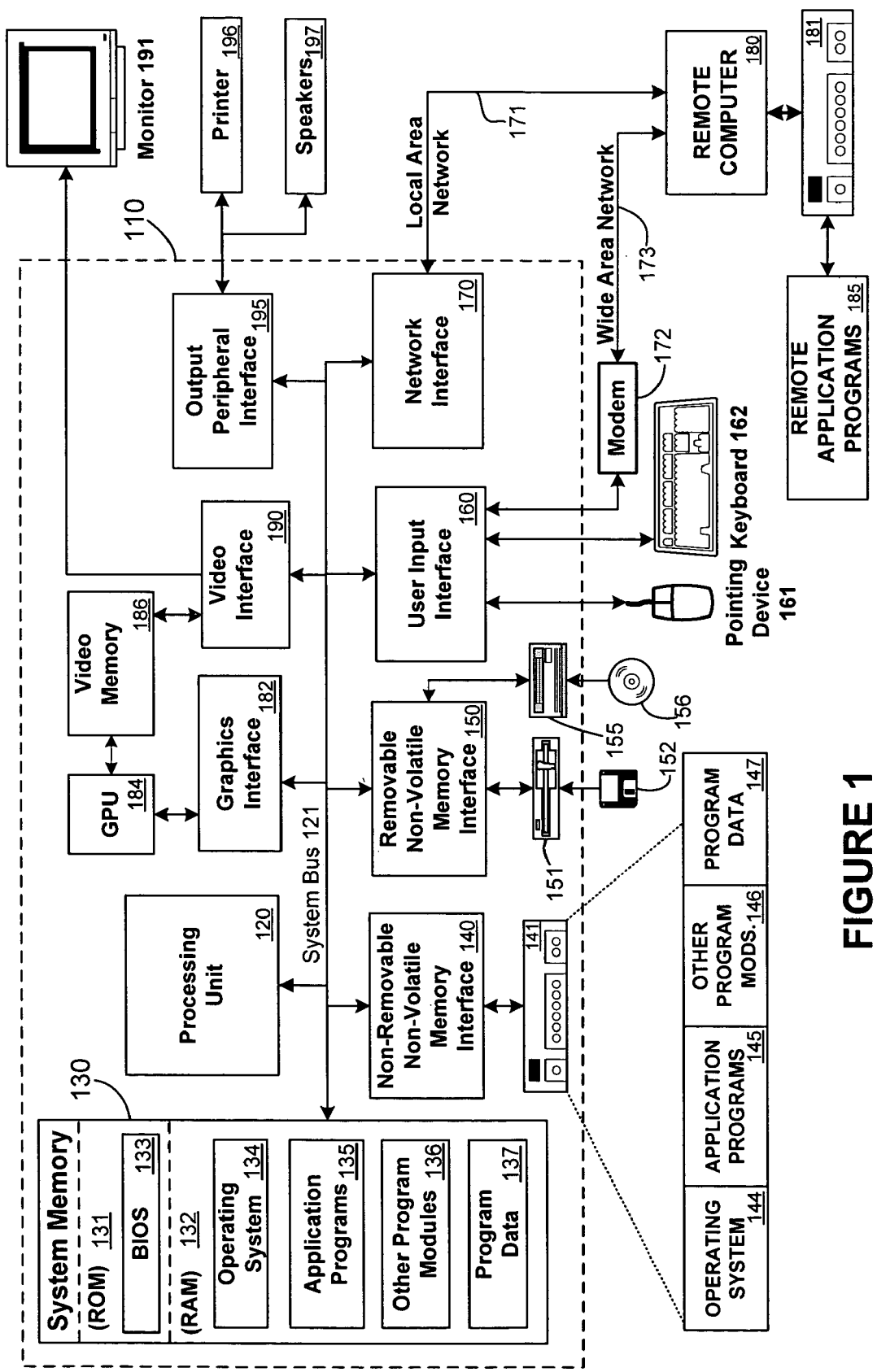
FIG. 1 is an example computing environment in which aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the example operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. Typically the functionality of the program modules may be combined or distributed as desired in various embodiments. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an example system for implementing the invention includes a general purpose computing device in the form of a computer 110. Components of computer 110 may include, but are not limited to, a processing unit 120, a system memory 130 and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read-only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146 and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are example and other means of establishing a communications link between the computers may be used.

Example Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While example embodiments herein are described in connection with software residing on a computing device, one or more portions of the invention may also be implemented via an operating system, API, or middleware software between a coprocessor and requesting object, such that services may be performed by, supported in, or accessed via all of .NET's languages and services, and in other distributed computing frameworks as well.

Example Embodiments

Figure 2A:
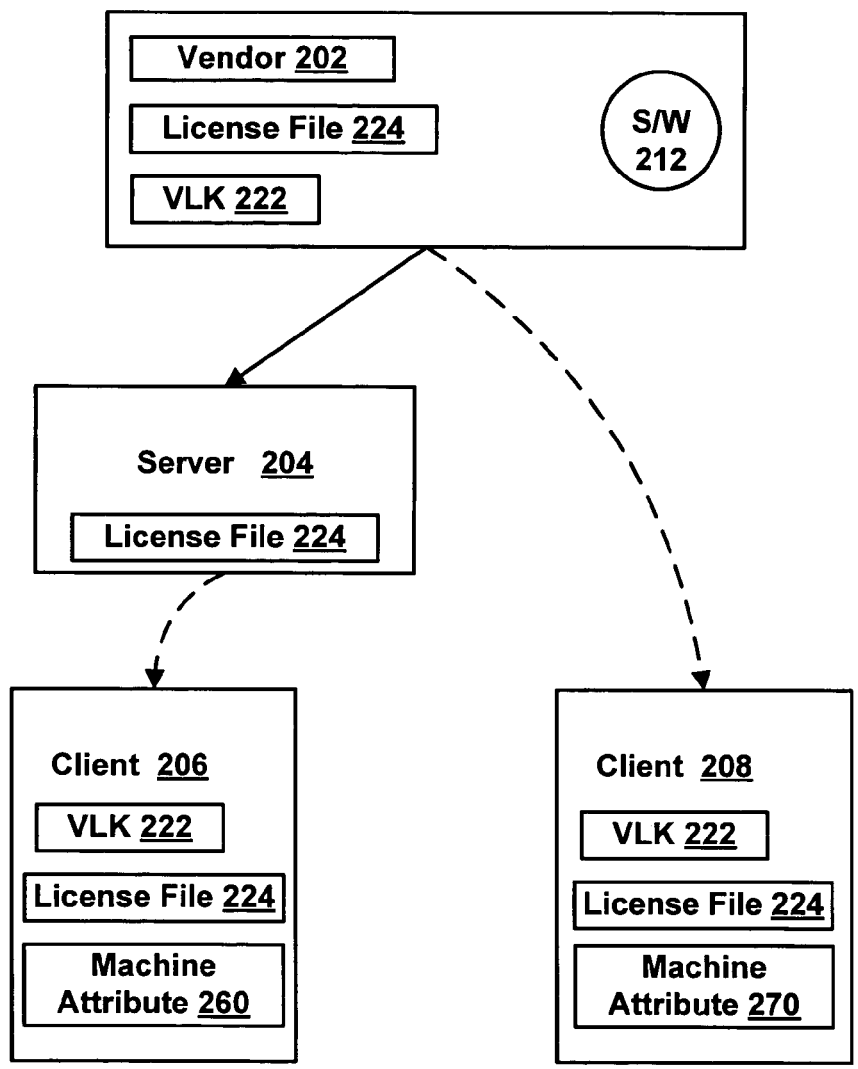
FIG. 2A is a block diagram illustrating an example hardware binding enforced system for deterring software piracy in accordance with one embodiment of the present invention.

FIG. 2A is a block diagram of a system of hardware binding enforced distribution for deterring piracy of software in accordance with one embodiment of the invention. Server 204 or vendor 202 may be connected to one or more clients 206 or 208 via a network such as a WAN, LAN (wired or wireless), intranet, the Internet or the like. In FIG. 2A, the dotted lines illustrate alternate implementations of the invention, illustrating that server 204 is optional because its role is for initial license file discovery and is not required for implementing the invention.

A software vendor may provide a volume license holder a copy of volume licensed software 212 on some media such as, but not limited to, a CD-ROM, or directly by way of a network, such as those described above. Accompanying the software 212 may be an enterprise-specific or volume-license-holder-specific VLK 222. In one embodiment of the invention, the VLK 222 may be embedded within a relatively large file, called the license file 224. The license file 224 may be constructed based upon, for example, an identification for the volume license holder and products that are licensed to the holder, and may include environmental binding information such as hashed domain controllers (DC) names, active directories (ADs), etc.

Furthermore, in one embodiment, the license file 224 may include hardware binding information based upon, for example, one or more machine attributes 260 and/or 270. For example, the license file 224 may contain a machine attribute 260 or 270 from one or more clients 206 or 208, respectively. The machine attribute may be any type of data that identifies a hardware device associated with the client 206 or 208. For example, a machine attribute may be a processor ID or the like. The machine attribute 260 or 270 that is used in the license file 224 may be hashed or otherwise processed into the license file 224. Thus, the license file 224 may, in effect, contain an image of the customer's computing environment in terms of the hardware contained within a customer's network of clients 206 and/or 208.

It will be appreciated that the inclusion of a machine attribute 260 or 270, whether as a hashed value or otherwise, in the license file 224 prevents a potential software pirate from copying a customer environment of a lawful copy of the software 212. For example, if a customer has three client computers named "client1," "client2" and "client3," a software pirate could attempt to copy the software into a second network with, for example, identical client names. By incorporating a machine attribute from one or more of the client computers to incorporate hardware binding information into the license file 224, an image of the computing environment is created that can be used as a type of key. As will be discussed below, when a client 206 or 208 attempts to authenticate the software 212, the machine attributes of clients within the computing environment are used to create a second image of the computing environment. This image can then be compared to the initial image to determine if the software 212 is being installed in the proper computing environment. Thus, an embodiment provides a mechanism for verifying that a computer environment in which software 212 may operate is the actual environment for which the software 212 is authorized. As a result, it will be appreciated that piracy efforts that attempt to recreate the authorized environment may fail because an embodiment uses hardware-specific data to authorize the software 212.

Figure 2B:
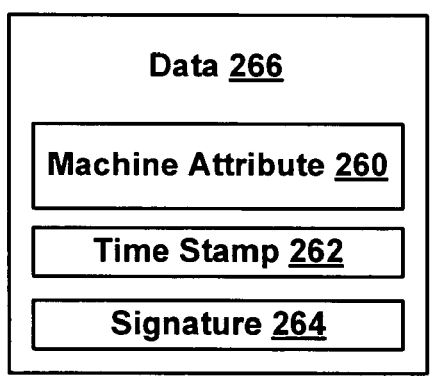
FIG. 2B is a block diagram of example client data that may be used in connection with one embodiment of the present invention.

In addition to including a machine attribute 260 and/or 270, the license file 224 may, according to an embodiment, contain a time stamp that is create when the machine attribute 260 or 270 is collected. The license file 224 may also include a signature or other such authentication mechanism. It will be appreciated that the inclusion of a time stamp associated with a machine attribute 260 and/or 270 helps to protect the software from "replay" attacks and the like because the hardware binding that is facilitated by the machine attribute 260 and/or 270 is known to be current. A graphical representation of example client data that may be collected from a client 206 in accordance with an embodiment is illustrated in connection with FIG. 2B. Referring now to FIG. 2B, an example of data 266 that can be sent from, for example, client 206 for incorporation into license file 224 is shown. In one embodiment, data 266 includes one or more machine attributes 260, a time stamp 262 and a signature 264. The signature may be used to verify the integrity of the license file 224 or the like.

Returning now to FIG. 2A, it is noted that in one embodiment the license file 224 may be a relatively large system file. The particular file type selected may be any type of file type including, but not limited to, image or audio file formats. VLK 222 may be embedded anywhere in the data, which in one embodiment may then be signed with a private key to generate the license file 224. In one embodiment of the invention, the size of the license file 224 is greater than 1.44 Megabytes (MB), such as, for example, 2 MB, to prevent copying the license file 224 onto a floppy disk or the like. In one embodiment of the invention the license file 224 may be provided on a CD-ROM containing only the license file 224 and having a volume label different from the volume label of the CD-ROM containing the associated software 212.

Referring now to the above-described environment in which the license holder's software 212 is distributed among clients 206, 208, etc., at logon, an activation code resident on client machines 206, 208, etc., reads the content of the license file 224 to verify that the license file 224 has not been tampered with. As utilized herein, activation refers to a process for validating software license data, network environment binding, hardware binding and enabling the software to be functional within a period of time without further binding validation. In this regard, during the software installation process, VLK 222 and/or license file 224 can be transmitted to clients 208, or to clients 206, e.g., via server 204. It is optional to receive the license file from the server location.

The verification process may include checking the license on the local machine against the binding(s) or policy defined in the license. For example, in the context of the image made of the customer's computing environment discussed above in connection with hardware binding, a client 206 or 208 that is attempting to verify the software 212 may again use machine attributes 260 or 270 as discussed above and a determination may be made as to whether the attributes match those contained in the license file 224. If not, the mismatch may indicate that an attempt is being made to install the software 212 on an unauthorized computer and/or environment. It will be appreciated that a customer may replace or add a client 206 or 208 to an already-existing computing environment. If the license file 224 does not allow for some variation between the environment image contained in the image file 224 and an environment image created when the software 212 is being authenticated, a customer would not be able to add the software 212 to a newly-added client 206, 208 without obtaining a new license file 224 from a vendor 202 and/or re-creating the license file and re-authenticating the software 212 on all clients 206 and 208 in the computing environment.

Thus, an embodiment provides for a hardware binding tolerance that may allow for some differences between the image created when the license file 224 was created for the environment, and the image created when the software 212 is to be authenticated on a particular client's computer. The tolerance may, for example, be set by the vendor 202, or the like, and may be selected to affect any level of security. It will be appreciated that, generally speaking, the greater the tolerance selected, the less security is provided because greater changes in the computing environment would be permitted. However, the larger tolerances also allow for greater customer flexibility in terms of the hardware changes the customer may make to the computing environment without having to reapply for a new license file 224. Thus, it will be appreciated that the level of such tolerance may need to be decided based on factors such as, for example, likelihood of piracy, customer needs, and the like.

The integrity of license file 224 can be verified by checking the signature of the file. If the license file 224 has not been tampered with, i.e., if the integrity is verified, the software may be allowed to run. If the license file 224 has been tampered with, the software may run in a reduced functionality mode.

Large scale deployments of software are typically too costly and time-consuming for an administrator to personally set up large numbers of machines. In addition, administrators often do not want end users to personally activate their machines. Hence, such installations are therefore usually automated, using unattended or remote processes.

Activation of volume licensed software can be performed during setup or can be performed at a later time. An unattended answer file is a text file that is used in conjunction with a software setup routine to bypass normal setup prompts. An unattended file can, for example, enter a VLK automatically, configure proxy settings and auto-activate the system on behalf of the end user, either through the target machine's local area network (LAN) or via the Internet. Activation can also be performed after setup using command-line scripts.

When installing the volume licensed software on clients 206, 208, etc., an installation image may be prepared with the aid of an unattended file. The unattended file is a specialized script that performs the unattended installation. The software 212 may be installed on the client machines 206, 208, etc. by executing the script. The script sets the location of the license file 224 to a list of known locations, including server 204. Alternatively, the license file 224 may be copied onto the client machines if the file is part of the installation image. Upon logon, the license file 224 is read, the data authenticated and the client machines 206, 208, etc., are activated. If the environment characteristics specified in the license file 224 cannot be verified while the system is connected, the system may continue to function in the grace period. Beyond the grace period, the system may function in the reduced functionality mode or the end user may request an extension from software vendor 202. If the license data cannot be verified while the system is disconnected, the software may continue to be functional only with disconnected features until the system joins a network again.

Figure 3:
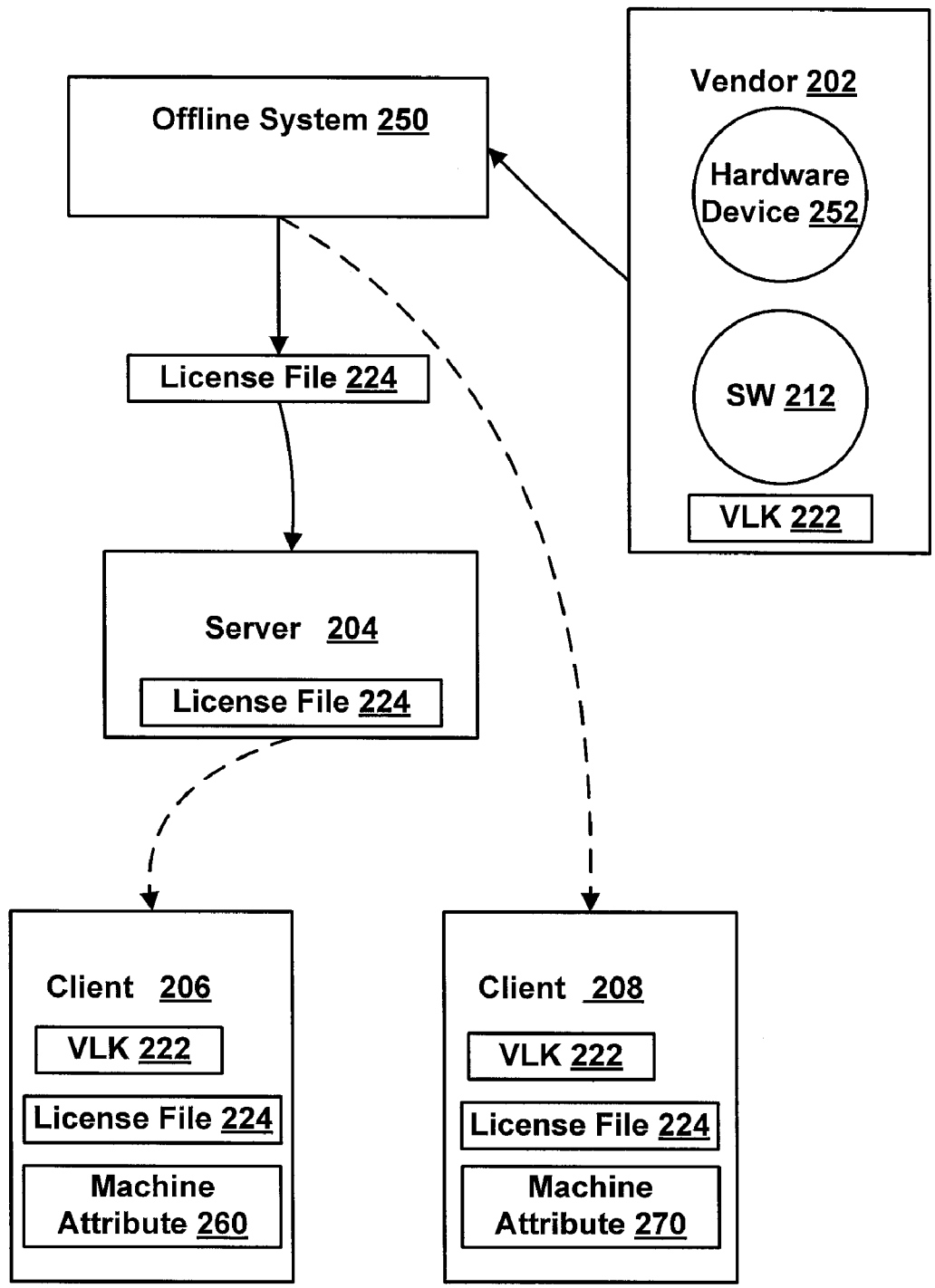
FIG. 3 is a block diagram illustrating an example off-line system for deterring software piracy in accordance with one embodiment of the present invention.

FIG. 3 is a block diagram of a hardware binding enforced off-line system 250 for deterring software piracy in accordance with one embodiment of the invention. In the off-line system, an enterprise receives the VLK 222 and the software vendor 202 supplied security hardware device 252. The hardware device 252 is capable of performing signing operations to generate license file 225 which is identical to license file 224 in format. The installation of the volume licensed software on client machines 206 and 208, the activation process, and the license validation procedure are the same as described in FIG. 2 in which the VLK license file is signed and also from the software vendor. As with FIG. 2A, in FIG. 3, the dotted lines illustrate alternate implementations of the invention.

Figure 4:
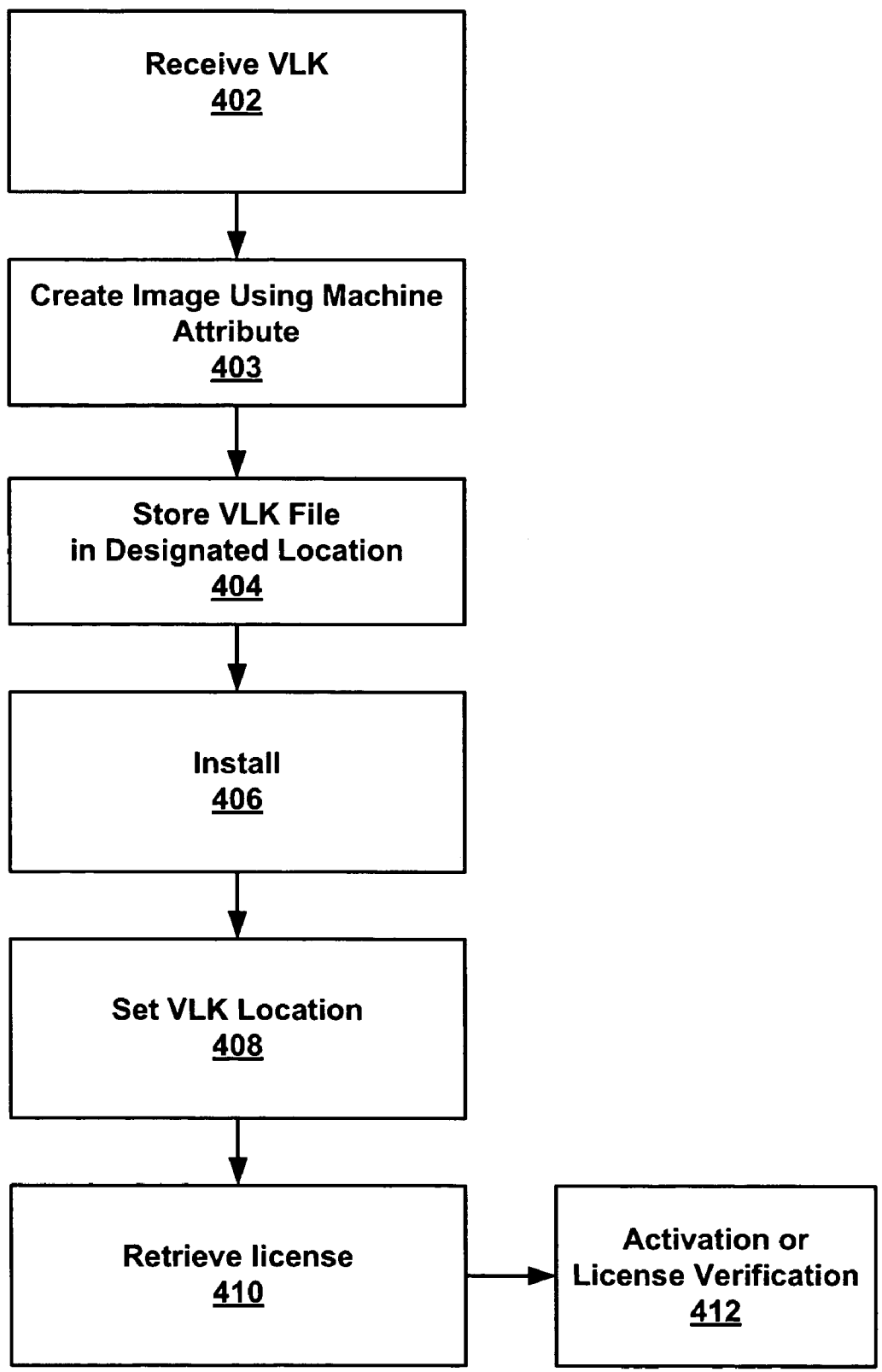
FIG. 4 is a flow diagram of an example method for deterring software piracy in a hardware binding enforced system in accordance with one embodiment of the present invention.

FIG. 4 is a flow diagram of a method of making software pirating more difficult in a hardware binding-enforced system. At step 402, an enterprise-specific VLK and its associated license file are received. At step 403, an installation image of the associated volume-licensed software may be prepared, for installation on one or more client machines. It will be appreciated that such image preparation may involve the collection of a machine attribute and other data as discussed above in connection with FIGS. 2A-B. At step 404, the hardware-specific or volume-license-holder-specific license file may be stored on a central server or deployed to client machines. The hardware-specific or volume-license-holder-specific license file may not be freely accessible to client machines associated with the server. A specialized script may be prepared that performs the unattended installation.

At step 406, the software is installed on the client machine or machines. At step 408, the script sets the location of the license file in a list of known locations in the system, either as deployed on the client machine(s) or by publishing the locations of the license file to client machine(s), e.g., via windows management interface (WMI) or via a hardcoded registry key. At step 410, upon logon, an activation routine retrieves the location of the license file. In the case of the license file being on a remote server, the script may optionally verify the location of the license file, e.g., by comparing Internet Protocol (IP) addresses. At step 412, the activation routine reads the data from the license file, verifies that the data is authentic, verifies the machine attribute characteristics specified in the license file, and activates the software. If the machine attribute characteristics specified in the license file cannot be verified while the system is connected, the system may continue to function in the grace period. In an embodiment, a determination may also be made in step 412 as to whether the license file is within a predetermined tolerance of the machine attribute characteristics specified in the license file as was discussed above in connection with FIG. 2A. If so, the software may be activated. Beyond the grace period, the system may function in the reduced functionality mode or the end user may request an extension from software vendor. If the license data cannot be verified while the system is disconnected, the software will continue to be functional only with disconnected features until the system joins a network again.

It is noted that the foregoing examples have been provided merely for the purpose of explanation and are in no way to be construed as limiting of the present invention. It is also noted that there are a variety of ways of implementing the present invention, e.g., an appropriate API, tool kit, driver code, dynamic linked library (DLL), operating system, control, standalone or downloadable software object, etc. that enables applications and services to obtain licensing information according to the invention. The invention contemplates the use of the invention from the standpoint of an API (or other software object), as well as from a software or hardware object that communicates in connection with a VLK licensing technique as described herein. Thus, various implementations of the invention described herein may have aspects that are wholly in hardware, partly in hardware and partly in software, as well as in software.

As mentioned above, while example embodiments of the present invention have been described in connection with various computing devices and network architectures, the underlying concepts may be applied to any computing device or system in which it is desirable to deter piracy. Thus, the techniques for encoding/decoding data in accordance with the present invention may be applied to a variety of applications and devices. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While example programming languages, names and examples are chosen herein as representative of various choices, these languages, names and examples are not intended to be limiting. With respect to embodiments referring to the use of a control for achieving the invention, the invention is not limited to the provision of a .NET control, but rather should be thought of in the broader context of any piece of software (and/ore hardware) that achieves the piracy deterrent objectives in accordance with the invention. One of ordinary skill in the art will appreciate that there are numerous ways of providing object code and nomenclature that achieves the same, similar or equivalent functionality achieved by the various embodiments of the invention. The invention may be implemented in connection with an on-line auction or bidding site as well.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the piracy deterrent techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in example embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while example network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-implemented method of deterring software piracy in a volume license environment, comprising:
    collecting at least one machine attribute from each of at least three computing devices of the volume license environment and hashing the collected machine attributes to form a first data;
    receiving a volume license key embedded within a volume license file, the volume license key including the first data;
    authenticating the volume license file using a second data derived from the collected machine attributes of the volume license environment; and
    activating a software package associated with the volume license key on at least one of the at least three computing devices in the volume license environment in response to authenticating the volume license file;
    wherein the volume license key and volume license file are associated with the software package for installation on a plurality of computing devices including the at least three computing device.

2. The method of claim 1, wherein the collected machine attribute attributes are hardware identifier identifiers.

3. The method of claim 1, wherein said authenticating step further comprises determining that the second data matches the first data within a predetermined tolerance.

4. The method of claim 1, further comprising collecting a time stamp indicating a time at which the machine attribute attributes were collected.

5. A system for deterring software piracy in a computing environment including a plurality of computing devices, the system comprising:
    at least three computing devices;
    a computer processor, the processor:
        receiving a software package associated with a volume license key that is embedded within a volume license file, the volume license key including a first data, the first data having a hashed value derived from at least one machine attribute collected from each of the at least three computing devices of the computing environment;
        executing an authentication routine for deriving a second data from the collected machine attribute attributes of the computing environment and comparing the second data to the first data; and
        executing an activation routine for activating the software package on at least one of the at least three computing devices according to the volume license key and in response to authenticating the volume license file;
        wherein the volume license key and volume license file are associated with the software package for installation on the plurality of computing devices including the at least three computing device.

6. The system of claim 5, wherein the authentication routine further determines that the second data matches the first data within a predetermined tolerance.

7. The system of claim 5, wherein the first data further has a time stamp corresponding to when the first data was derived.

8. A computer-readable storage medium having computer-executable instructions stored thereon, the instructions when executed by a processor causing the processor to implement a method of deterring software piracy in a volume license environment, the method comprising:
    collecting at least one machine attribute from each of at least three computing devices of the volume license environment and hashing the collected machine attributes to form a first data;
    receiving a volume license key embedded within a volume license file, the volume license key including the first data;
    authenticating the volume license file using a second data derived from the collected machine attributes of the volume license environment; and
    activating a software package associated with the volume license key on at least one of the at least three computing devices in the volume license environment in response to authenticating the volume license file;
    wherein the volume license key and volume license file are associated with the software package for installation on a plurality of computing devices including the at least three computing device.

9. The computer-readable storage medium of claim 8, wherein the collected machine attribute attributes are hardware identifiers.

10. The computer-readable storage medium of claim 8, wherein said authenticating step further comprises determining that the second data matches the first data within a predetermined tolerance.

11. The computer-readable storage medium of claim 8, wherein the method further comprises collecting a time stamp indicating a time at which the machine attribute attributes were collected.

* * * * *